United States Patent
Ye et al.

(10) Patent No.: US 10,440,391 B2
(45) Date of Patent: Oct. 8, 2019

(54) METHOD AND APPARATUS OF VIDEO CODING

(71) Applicant: MEDIATEK INC., Hsinchu (TW)

(72) Inventors: Jing Ye, San Jose, CA (US); Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 45 days.

(21) Appl. No.: 15/658,854

(22) Filed: Jul. 25, 2017

(65) Prior Publication Data
US 2018/0041773 A1    Feb. 8, 2018

Related U.S. Application Data

(60) Provisional application No. 62/371,251, filed on Aug. 5, 2016.

(51) Int. Cl.
| | | |
|---|---|---|
| *H04N 19/593* | (2014.01) | |
| *H04N 19/176* | (2014.01) | |
| *H04N 19/186* | (2014.01) | |
| *H04N 19/11*  | (2014.01) | |

(52) U.S. Cl.
CPC ........... *H04N 19/593* (2014.11); *H04N 19/11* (2014.11); *H04N 19/176* (2014.11); *H04N 19/186* (2014.11)

(58) Field of Classification Search
CPC .... H04N 19/11; H04N 19/176; H04N 19/186; H04N 19/593
See application file for complete search history.

(56) References Cited

U.S. PATENT DOCUMENTS

| | | | |
|---|---|---|---|
| 2013/0188744 A1* | 7/2013 | Van der Auwera | ......................... H04N 19/117 375/240.29 |
| 2014/0072041 A1* | 3/2014 | Seregin | ................ H04N 19/105 375/240.13 |
| 2016/0373770 A1* | 12/2016 | Zhao | .................... H04N 19/124 |

* cited by examiner

*Primary Examiner* — Farzana Hossain
(74) *Attorney, Agent, or Firm* — Oblon, McClelland, Maier & Neustadt, L.L.P.

(57) ABSTRACT

Aspects of the disclosure include a method of video coding. The method includes receiving input data associated with a first block and a second block of an image frame, the first block and the second block corresponding to different color space components. The method further includes identifying a reference region in the first block, identifying at least two reference unit cells among a plurality of unit cells in the reference region, identifying respective intra prediction modes for processing the identified reference unit cells, determining an intra prediction mode for processing a sub-block in the second block based on the identified intra prediction modes, and generating an intra predictor of the sub-block based on the determined intra prediction mode. The reference region and the sub-block correspond to a same region in the image frame. The method further includes encoding or decoding the sub-block based on the intra predictor of the sub-block.

22 Claims, 11 Drawing Sheets

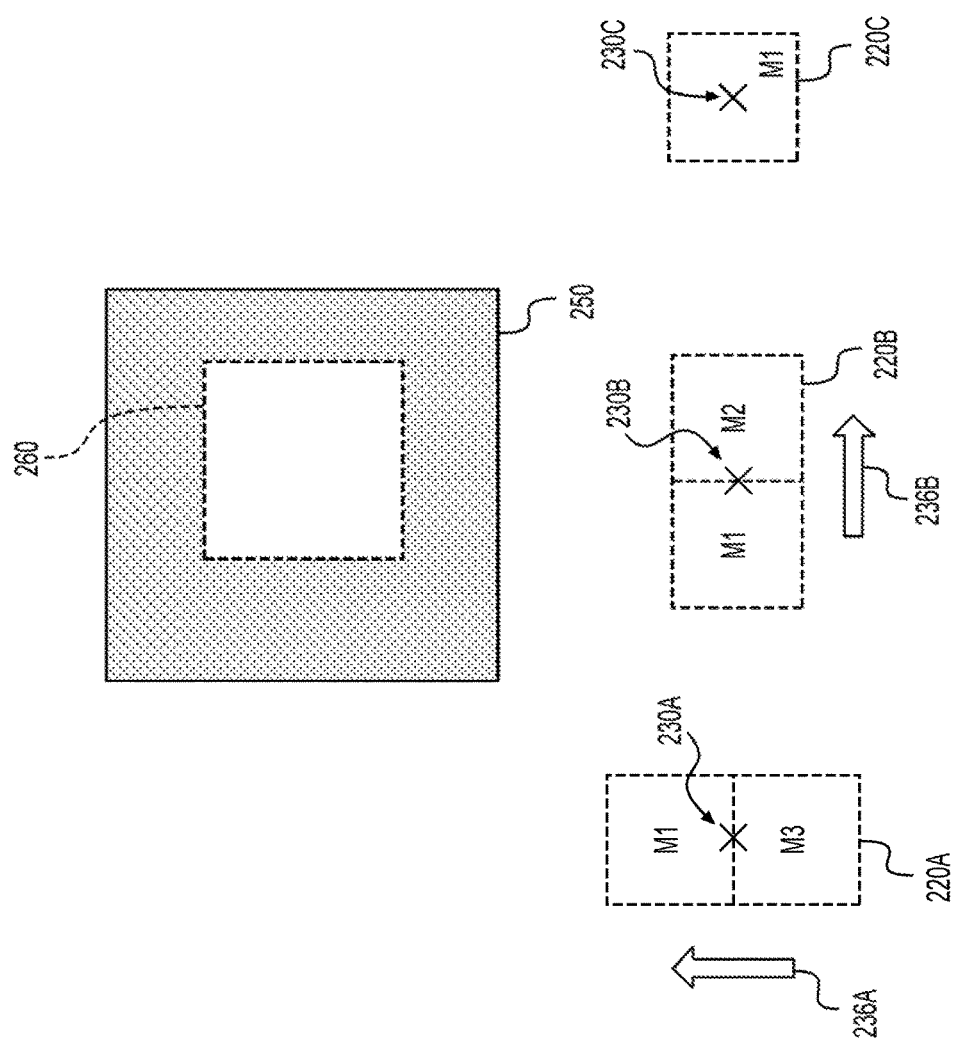

METHOD AND APPARATUS OF VIDEO CODING

INCORPORATION BY REFERENCE

This present disclosure claims the benefit of U.S. Provisional Application No. 62/371,251, "Methods for QTBT intra chroma coding and intra inter-mode in image and video compression" filed on Aug. 5, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards divide an image frame of an input video into one or more coding tree units (CTUs), and each CTU includes coding tree structures that correspond to different color space components of a predetermined color space. In some applications, the predetermined color space may include an RGB color space having a red component (R), a green component (G), and a blue component (B); an YCbCr color space having a luma component (Y), a blue-difference chroma component (Cb), and a red-difference chroma component (Cr); a YCoCg color space having a luma component (Y), an orange chroma component (Co), and a green chroma component (Cg); or the like.

Moreover, each CTU may be divided into one or more coding blocks, and each coding block may be a combination of a prediction portion and a residue portion. In some applications, a prediction portion may include one or more prediction blocks, and a predictor of a prediction block can be generated by extrapolating samples of neighboring pixels adjacent to the prediction block based on a prediction mode selected from a plurality of predetermined prediction modes. Such prediction scheme may reduce spatial redundancy in the encoded video data and is also known as an intra prediction.

SUMMARY

Aspects of the disclosure provide a method of video coding. The method includes receiving input data associated with a first block and a second block of an image frame, the first block corresponding to a first color space component, and the second block corresponding to a second color space component. The method further includes identifying a reference region in the first block, identifying at least two reference unit cells among a plurality of unit cells in the reference region, identifying respective intra prediction modes for processing the identified reference unit cells, determining an intra prediction mode for processing a sub-block in the second block based on the identified intra prediction modes, and generating an intra predictor of the sub-block in the second block based on the determined intra prediction mode. The reference region and the sub-block in the second block correspond to a same region in the image frame, and the reference region being partitioned into the plurality of unit cells. The method further includes encoding or decoding the sub-block in the second block for output based on the intra predictor of the sub-block in the second block.

In an embodiment, the first color space component is a luma component, and the second color space component is a chroma component.

In an embodiment, determining the intra prediction mode may include setting a most frequent intra prediction mode among the identified intra prediction modes as the intra prediction mode for processing the sub-block in the second block.

In an embodiment, determining the intra prediction mode may include identifying a plurality of most frequent intra prediction modes among the identified intra prediction modes, and selecting one of the plurality of most frequent intra prediction modes based on a predetermined order as the intra prediction mode for processing the sub-block in the second block.

The at least two reference unit cells may be at or adjacent to a center of the reference region. The at least two reference unit cells may include a predetermined number of reference unit cells that are clustered about the center of the reference region. The at least two reference unit cells may be adjacent to different corners of the reference region, respectively. The at least two reference unit cells may include multiple groups of reference unit cells that are clustered about different corners of the reference region, respectively.

In an embodiment, the at least two reference unit cells may be in at least one predetermined row of the plurality of unit cells or in at least one predetermined column of the plurality of unit cells.

Additionally, in an embodiment, each unit cell has a size equal to a predetermined minimum coding unit size.

Aspects of the disclosure can further provide a processing circuit that is configured to receive input data associated with a first block and a second block of an image frame, the first block corresponding to a first color space component, and the second block corresponding to a second color space component. The processing circuit can be further configured to identify a reference region in the first block, identify at least two reference unit cells among a plurality of unit cells in the reference region, identify respective intra prediction modes for processing the identified reference unit cells, determine an intra prediction mode for processing a sub-block in the second block based on the identified intra prediction modes, and generate an intra predictor of the sub-block in the second block based on the determined intra prediction mode. The reference region and the sub-block in the second block correspond to a same region in the image frame, and the reference region is partitioned into the plurality of unit cells. The processing circuit can be further configured to encode or decode the sub-block in the second block for output based on the intra predictor of the sub-block in the second block.

Aspects of the disclosure further provide a non-transitory computer readable medium storing program instructions for causing a processing circuit of an apparatus to perform a video coding method. The method includes receiving input data associated with a first block and a second block of an image frame, the first block corresponding to a first color space component, and the second block corresponding to a second color space component. The method further includes identifying a reference region in the first block, identifying at least two reference unit cells among a plurality of unit cells in the reference region, identifying respective intra prediction modes for processing the identified reference unit cells, determining an intra prediction mode for processing a sub-block in the second block based on the identified intra prediction modes, and generating an intra predictor of the sub-block in the second block based on the determined intra prediction mode. The reference region and the sub-block in the second block correspond to a same region in the image frame, and the reference region is partitioned into the plurality of unit cells. The method further includes encoding or decoding the sub-block in the second block for output based on the intra predictor of the sub-block in the second block.

Aspects of the disclosure further provide a method of video coding. The method may include receiving input data associated with a first block and a second block of an image frame, the first block corresponding to a first color space component, and the second block corresponding to a second color space component. The method may further includes identifying a reference region in the first block, identifying a unit cell in the reference region that is closest to a center of the reference region in a predetermined direction as a reference unit cell, identifying an intra prediction mode for processing the identified reference unit cell, determining an intra prediction mode for processing a sub-block in the second block based on the identified intra prediction mode, and generating an intra predictor of the sub-block in the second block based on the determined intra prediction mode. The reference region and the sub-block in the second block correspond to a same region in the image frame, and the reference region is partitioned into one or more unit cells. The method may further includes encoding or decoding the sub-block in the second block for output based on the intra predictor of the sub-block in the second block.

BRIEF DESCRIPTION OF THE DRAWINGS

Various embodiments of this disclosure that are proposed as examples will be described in detail with reference to the following figures, wherein like numerals reference like elements, and wherein:

FIGS. 2A-2C show diagrams illustrating determining a derived intra prediction mode based on identifying one or more reference unit cells in a reference region in a first block for processing a sub-block in a second block according to an exemplary embodiment of the disclosure;

DETAILED DESCRIPTION OF EMBODIMENTS

Figure 1:
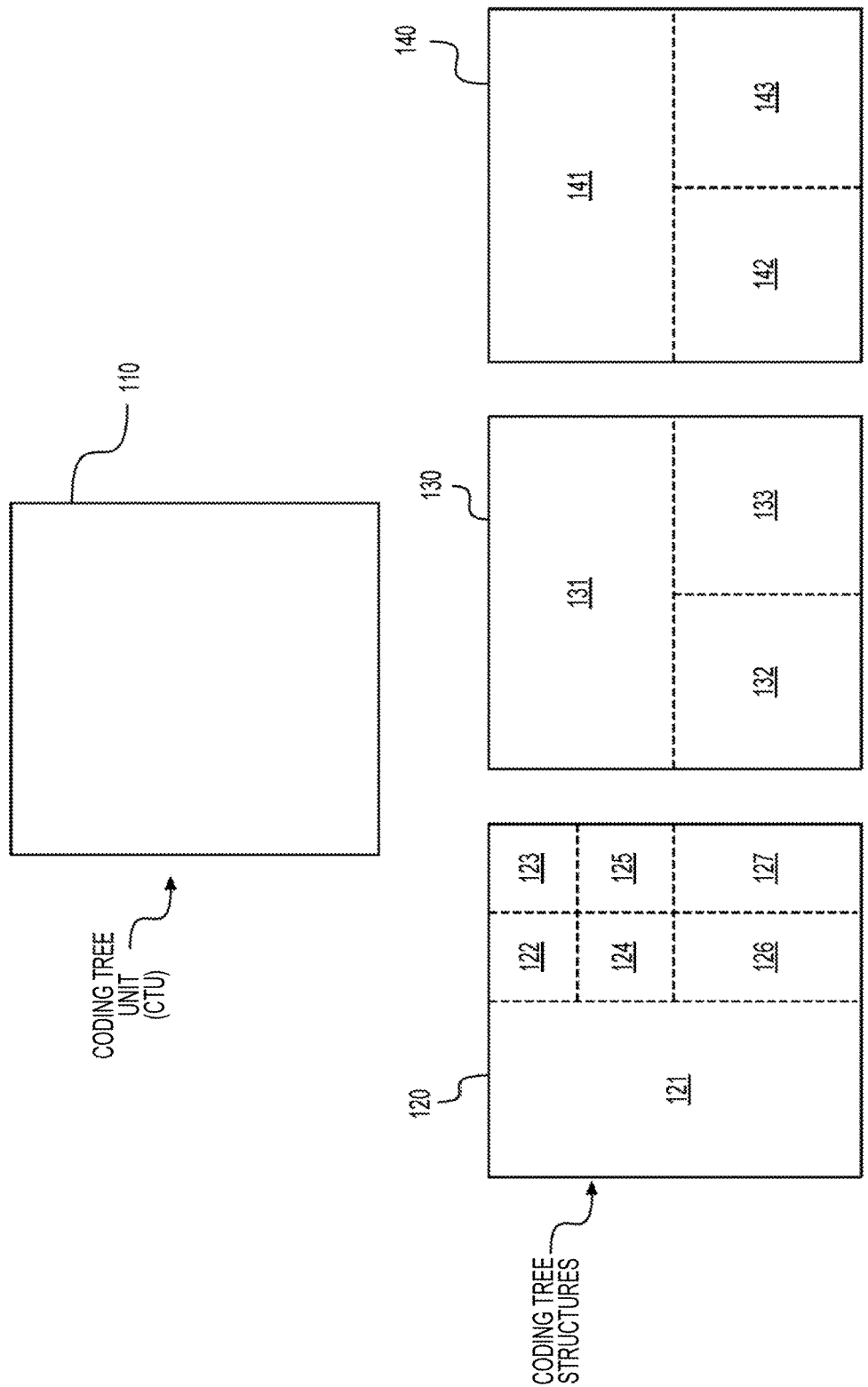
FIG. 1 shows a diagram illustrating a coding tree unit (CTU) and corresponding coding tree structures according to an exemplary embodiment of the disclosure.

FIG. 1 shows a diagram illustrating a coding tree unit (CTU) 110 and corresponding coding tree structures 120, 130, and 140 according to an exemplary embodiment of the disclosure. The CTU 110 may correspond to an image block of an image frame that can be represented by plural color space components of a predetermined color space. The predetermined color space may be an RBG, YUV, YCbCr, or YCoCg color space, or the like. For example, the CTU 110 may correspond to an image block that is represented by an YCbCr color space, which may include a luma component (Y), a blue-difference chroma component (Cb), and a red-difference chroma component (Cr). Accordingly, the CTU 110 may be divided into three coding tree structures 120, 130, and 140, where each coding tree structure corresponds to a respective one of the color space components of the image block. For example, coding tree structure 120 may correspond to the luma component, coding tree structure 130 may correspond to the blue-difference chroma component, and coding tree structure 140 may correspond to the red-difference chroma component.

Each coding tree structure 120, 130, and 140 may be further divided into coding blocks. Each coding block may include a prediction portion that can be further divided into one or more prediction blocks, and a residual portion that can be further divided into one or more residual blocks. For example, coding tree structure 120 may include prediction blocks 121-127; coding tree structure 130 may include prediction blocks 131-133; and coding tree structure 140 may include prediction blocks 141-143. Also, according to the color format used to divide the image block into different color space components, the number of pixels in the coding tree structure 120 and/or the spatial resolutions thereof may be different from those of the coding tree structures 130 or 140. The block partitions of the coding tree structure 120, coding tree structure 130, and coding tree structure 140 may be implemented using a quadtree partitioning structure or a quadtree plus binary tree (QTBT) partitioning structure. In some examples using the QTBT partitioning structure, each coding block may correspond to a single prediction portion and/or a single residual portion without any further partitioning. As such, in some examples using the QTBT partitioning structure, a prediction block is the same a coding block, and the terminologies thus may be used interchangeably.

When a predictor of a prediction block within a coding tree structure is to be encoded or decoded using intra prediction, an intra prediction mode to be used to encode or decode the predictor can be obtained using a derived intra prediction mode or selected from a plurality of candidate modes including at least the derived intra prediction mode. In some examples, the derived intra prediction mode for a predictor in a coding tree structure, such as coding tree structure 130, can be derived from one or more intra prediction modes used in another coding tree structure, such as coding tree structure 120, of the same CTU 110.

In some examples, a derived intra prediction mode for processing a current prediction block in a current coding tree structure associated with the CTU 110 (e.g., coding tree structure 130) may be obtained according to an intra prediction mode for processing a reference pixel in a predetermined reference coding tree structure associated with the same CTU 110 (e.g., coding tree structure 120), where the reference pixel may correspond to the top left pixel of the current prediction block. Because the block partitioning structures of the coding tree structure 120, the coding tree structure 130, and/or the coding tree structure 140 may be different, the current prediction block in the current coding tree structure may not have a corresponding counterpart in the reference coding tree structure that correspond to the same region in the image frame. In other words, the current prediction block may correspond to a region in the image frame that overlaps multiple regions to which multiple prediction blocks in the reference coding tree structure correspond (i.e., overlapped prediction blocks). Therefore, among the prediction modes of the overlapped prediction blocks in the reference coding tree structure, the prediction mode for processing the reference pixel that corresponds to the top left pixel of the current prediction block may not always be the best representative prediction mode for processing the current prediction block.

Figure 2A:
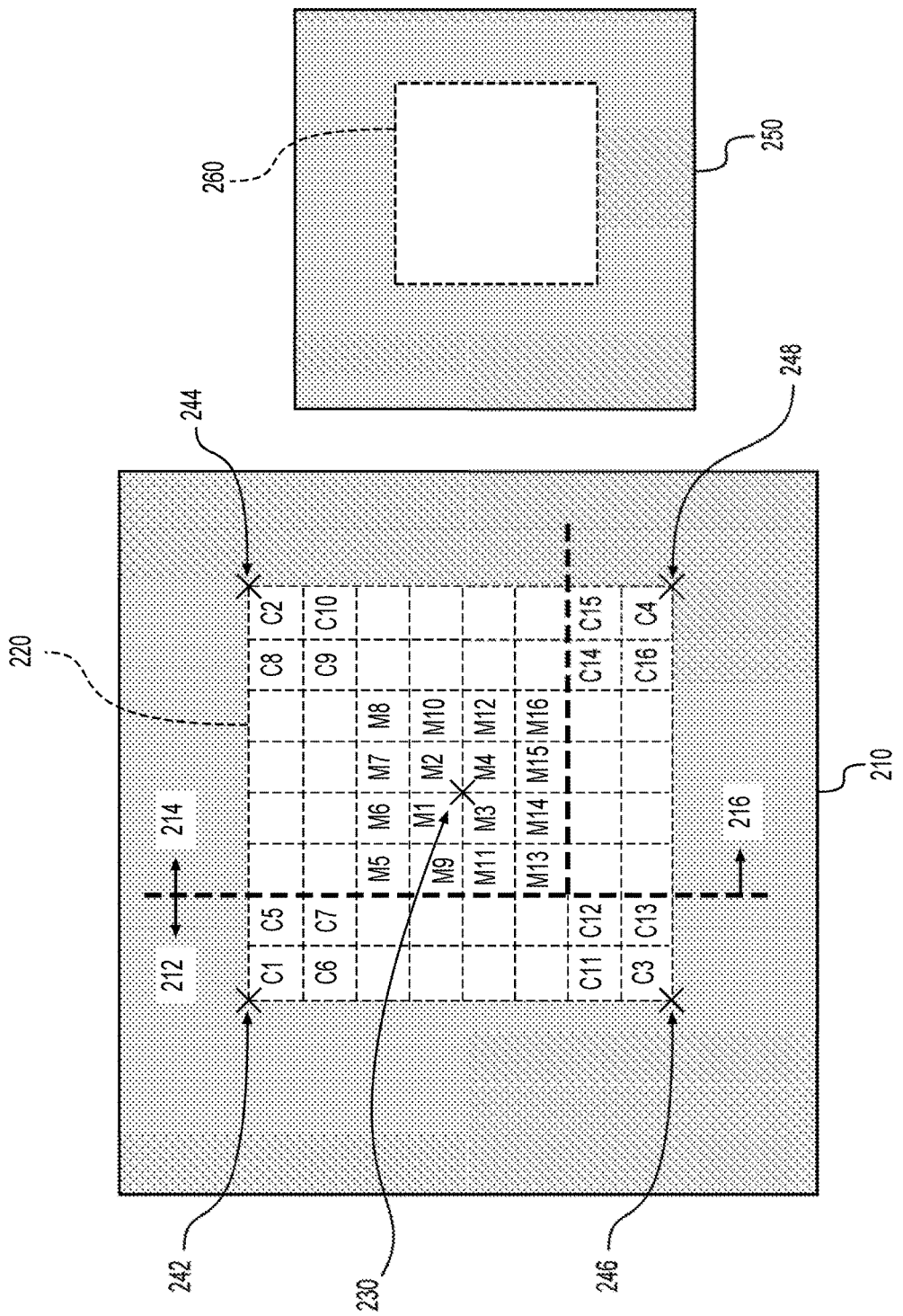

FIG. 2A shows a diagram illustrating determining a derived intra prediction mode based on at least two reference unit cells in a reference region 220 in a first block 210 for processing a sub-block 260 in a second block 250 according to an exemplary embodiment of the disclosure. The first block 210 and the second block 250 may correspond to different ones of the coding tree structures 120, 130, and 140 in FIG. 1 that belong to a same CTU of an image frame. Also, the sub-block 260 may correspond to a prediction block of the second block 250.

In some examples, the first block 210 corresponds to a first color space component of a predetermined color space, and the second block 250 corresponds to a second color space component of the predetermined color space. For example, when the predetermined color space is the YCbCr color space, the first color space component may be the luma component (Y), and the second color space component may be the blue-difference chroma component (Cb) or the red-difference chroma component (Cr).

In order to encode or decode the sub-block 260 in the second block 250 using intra prediction, an intra predictor of the sub-block 260 is to be generated based on an intra prediction mode for processing the sub-block 260. The intra prediction mode for processing the sub-block 260 may be specified in the corresponding encoded video data. To improve the coding efficiency, the intra prediction mode for processing the sub-block 260 may be obtained using a derived intra prediction mode or selected from a plurality of candidate modes including at least the derived intra prediction mode. The derived intra prediction mode for processing the sub-block 260 can be derived from the intra prediction mode(s) used in the first block 210.

For example, the reference region 220 within the first block 210 may be identified according to a region in the original image frame to which the sub-block 260 corresponds, such that the reference region 220 and the sub-block 260 correspond to a same region in the image frame. Because the first block 210 and the second block 250 may have different block partitioning structures, the reference region 220 may overlap multiple prediction blocks 212, 214, and 216 of the first block 210. Moreover, the reference region 220 can be partitioned into a plurality of unit cells (e.g., 8×8 rectangular areas in the reference region 220 shown in FIG. 2A). Each unit cell may have a predetermined size according to a predetermined video coding standard. In some examples, each unit cell may have a size equal to a predetermined minimum coding unit size according to a predetermined video coding standard. The predetermined minimum coding unit size may have a square shape having 4×4 pixels, 8×8 pixels, 16×16 pixels, or the like. Also, the predetermined minimum coding unit size may have a rectangular shape having different height and width.

In yet another examples, each unit cell may have a size determinable based on a predetermined minimum height and a predetermined minimum width of a coding unit according to a predetermined video coding standard. For example, the reference region 220 may be divided in to N×K unit cells, where N=width of the reference region/minimum coding unit width, and K=height of the reference region/minimum coding unit height.

In some examples, at least two reference unit cells may be identified among the plurality of unit cells of the reference region 220. Respective intra prediction modes for processing the identified reference unit cells can be further identified, and the derived intra prediction mode for the sub-block 260 may be determined based on the identified intra prediction modes of the identified reference unit cells.

In some examples, a most frequent intra prediction mode among the identified intra prediction modes can be set as the derived intra prediction mode for the sub-block 260. In some examples when there are two or more most frequent intra prediction modes among the identified intra prediction modes, one of the most frequent intra prediction modes can be selected as the derived intra prediction mode based on a predetermined order. For example, the predetermined order may be based on a location of corresponding reference unit cells, closeness to a most frequent intra prediction mode of the entire image frame or the current coding tree structure, a predetermined sequence of all available intra prediction modes, or the like. In some examples, the predetermined order may be signaled in the corresponding encoded video data, derived based on information included in the encoded video data, or defined in a predetermined video coding standard. Of course, in at least one example, the one of the most frequent intra prediction modes may be randomly selected without any particular order.

As shown in FIG. 2A, the reference region 220 includes a center 230 and four corners 242, 244, 246, and 248. The identified reference unit cells may include at least two reference unit cells that are at or adjacent to the center 230 of the reference region 220. For example, four middle unit cells M1, M2, M3, and M4 that are adjacent to the center 230 of the reference region 220 may be identified as the reference unit cells. The intra prediction modes for processing middle unit cells M1, M2, M3, and M4 can be used to determine the derived intra prediction mode for processing the sub-block 260. In some examples, the identified reference unit cells may include a predetermined number of reference unit cells that are clustered about the center 230 of the reference region 220. For example, the four middle unit cells M1-M4 or the sixteen middle unit cells M1-M16 that are clustered about the center 230 of the reference region 220 may be identified as the reference unit cells. In other examples, a different number (e.g., 4, 8, 16, 32, etc.) of unit cells or a different pattern for locating the unit cells can be used to identify reference unit cells that are clustered about the center 230.

Moreover, the identified unit cells may include multiple groups of reference unit cells that are clustered about different corners 242, 244, 246, and/or 248 of the reference region 220, respectively. For example, four individual corner unit cells C1, C2, C3, and C4 are respectively clustered about corners 242, 244, 246, and 248 may be identified as the reference unit cells. The intra prediction modes for processing corner unit cells C1, C2, C3, and C4 can be used to determine the derived intra prediction mode for processing the sub-block 260. Also, the identified reference unit cells may include a predetermined number of reference unit cells that are clustered about different corners 242, 244, 246, and/or 248. For example, four unit cells from each corner, including unit cells C1-C16 that are clustered about corners 242, 244, 246, and 248, respectively, may be identified as the reference unit cells. In other examples, which corner(s) to be used can vary and a different number (e.g., 1, 4, 8, 16, 32, etc.) of unit cells or a different pattern for locating the unit cells can be used to identify reference unit cells that are clustered about the corners 242, 244, 246, and/or 248.

Also, the identified reference unit cells may include unit cells locate at predetermined positions in the reference region. In some examples, the identified unit cells may be in at least one predetermined row of the plurality of unit cells. The at least one predetermined row can include a top-most row, a middle row, or a bottom-most row. In at least one example, the identified unit cells may include some or all the unit cells in the odd rows. In at least another example, the identified unit cells may include some or all the unit cells in the even rows.

In some examples, the identified unit cells may be in at least one predetermined column of the plurality of unit cells. The at least one predetermined column can include a left-most columns, a middle columns, or a right-most columns. In at least one example, the identified unit cells may include some or all the unit cells in the odd columns. In at least another example, the identified unit cells may include some or all the unit cells in the even columns.

In some examples, the identified unit cells may be both in at least one predetermined row of the plurality of unit cells and in at least one predetermined column of the plurality of unit cells, where the at least one predetermined row and the at least one predetermined column may be determinable based on any of the above-noted combinations.

In at least one example, all the unit cells in the reference region 220 are identified as reference unit cells for determining the derived intra prediction mode for processing the sub-block 260 of the second block 250.

Of course, the reference unit cells may be identified by any combination of the approaches described above and/or any suitable, predetermined selection approaches. In addition, the information for identifying reference unit cells may be signaled in the corresponding encoded video data, derived based on information included in the encoded video data, or defined in a predetermined video coding standard.

Figure 2B:
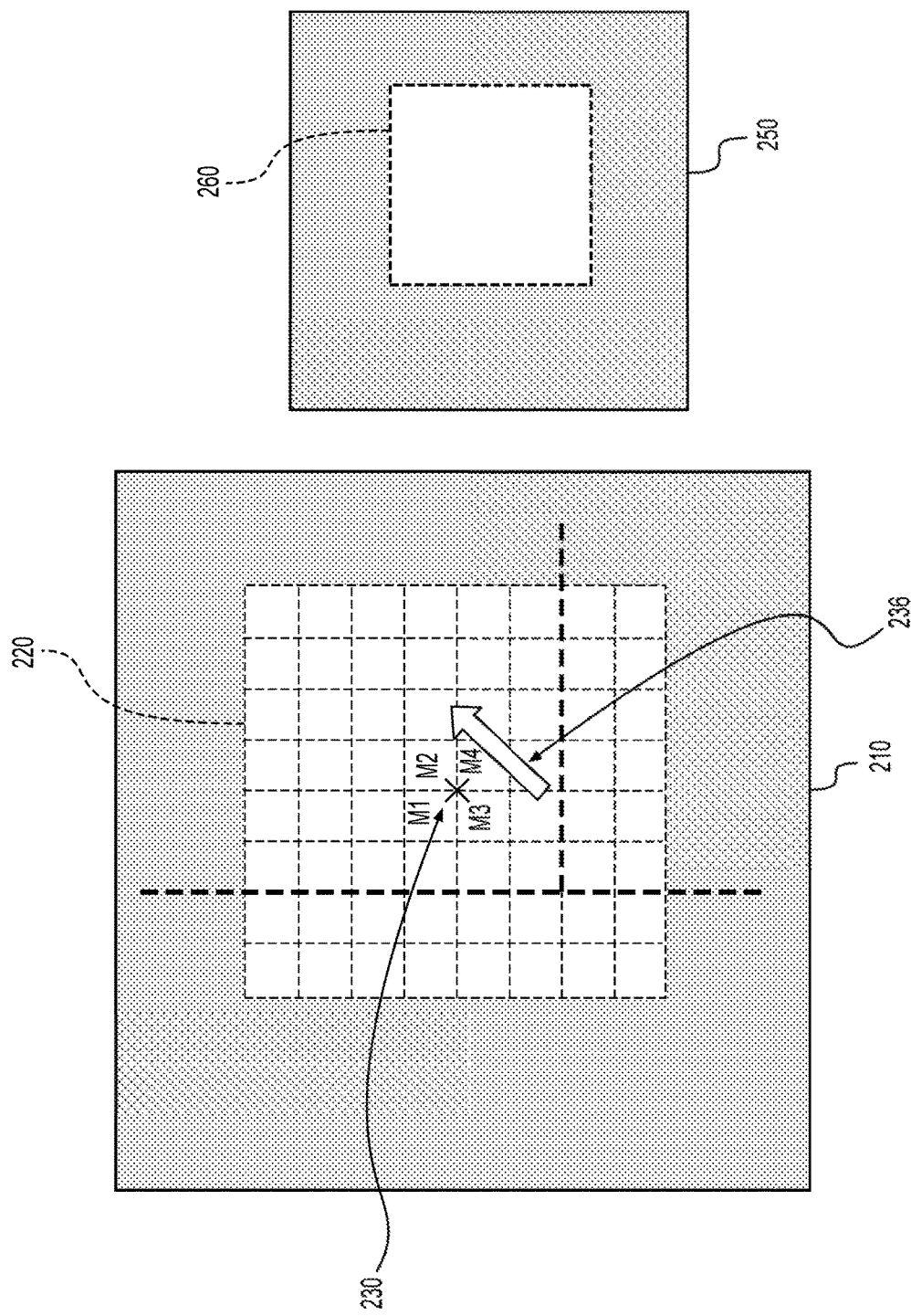

FIG. 2B shows a diagram illustrating determining a derived intra prediction mode based on a single reference unit cell in a reference region 220 in a first block 210 for a sub-block 260 in a second block 250 according to an exemplary embodiment of the disclosure. The single reference unit cell may be identified based on a center 230 of the reference region 210. Elements in FIG. 2B that are the same or similar to the elements in FIG. 2A are given the same reference numbers, and detailed description thereof is thus omitted.

Compared with the examples illustrated with reference to FIG. 2A, only one reference unit cell is identified in the example illustrated with reference to FIG. 2B. In some examples, a unit cell in the reference region 220 that is closest to the center 230 of the reference region 220 in a predetermined direction 236 can be identified as the reference unit cell. In the example as shown in FIG. 2B, the unit cell M2 is closest to the center 230 of the reference region 220 in the predetermined direction 236, and thus may be identified as the reference unit cell. In the example as shown in FIG. 2B, the predetermined direction 236 corresponds to an upper-right direction with respect to the center 230. In some examples, the predetermined direction 236 may correspond to an upper-left direction, a lower-right direction, a lower-left direction, or the like. The intra prediction mode for processing the unit cell M2 may be used as the derived intra prediction mode for processing the sub-block 260. In other examples, the unit cell M1, M3, or M4 can be selected as the reference unit cell consistent with corresponding designated directions.

Also, the information for identifying the reference unit cell, such as the predetermined direction 236, may be signaled in the corresponding encoded video data, derived based on information included in the encoded video data, or defined in a predetermined video coding standard.

FIG. 2C shows a diagram illustrating three more examples for identifying a single reference unit cell in a reference region 220A, 220B, or 220C based on the respective center 230A, 230B, or 230C thereof for a sub-block 260 in a second block 250 according to an exemplary embodiment of the disclosure. Elements in FIG. 2C that are the same or similar to the elements in FIG. 2B are given the same reference numbers, and detailed description thereof is thus omitted. Moreover, the reference regions 220A, 220B, and 220C correspond to the reference region 220 in FIG. 2B; and the centers 230A, 230B, and 230C correspond to the center 230 in FIG. 2B.

In addition to the examples illustrated with reference to FIG. 2B, in at least one example, a reference region 220A in the first block 210 may include one single column of unit cells. A reference unit cell can be identified based on the center 230A of the reference region 220A and a predetermined direction 236A. In this example, the unit cell M1 above the center 230A is the closest unit cell to the center 230A in the predetermined direction 236A, and thus can be selected as the reference unit cell. In this example, the predetermined direction 236A corresponds to an up direction with respect to the center 230A. In some examples, the predetermined direction 236A may correspond to a down direction, or the like.

In another example, a reference region 220B in the first block 210 may include one single row of unit cells. A reference unit cell can be identified based on the center 230B of the reference region 220B and a predetermined direction 236B. In this example, the unit cell M2 to the right of the center 230B is the closest unit cell to the center 230B in the predetermined direction 236B, and thus can be selected as the reference unit cell. In this example, the predetermined direction 236B corresponds to a right direction with respect to the center 230B. In some examples, the predetermined direction 236B may correspond to a left direction or the like.

In yet another example, a reference region 220C in the first block 210 may include only one unit cell, which will be identified as the reference unit cell for processing the sub-block 260 in the second block 250. In such scenario, the reference unit cell may still be analytically identified as the unit cell that is closest to the center 230C of the reference region 220C in any given direction.

The examples illustrated with reference to FIGS. 2A-2C may be applicable in conjunction with a predetermined video coding standard, such as the International Telecommunication Union Telecommunication Standardization Sector (ITU-T) H.264 standard (also known as H.264, MPEG-4 Part 10, Advanced Video Coding, MPEG-4 AVC, or H.264/

MPEG-4 AVC standard), the ITU-T H.265 standard (also known as H.265, High Efficiency Video Coding, HEVC, or H.265/HEVC standard), or any other suitable video coding standard.

Figure 3:
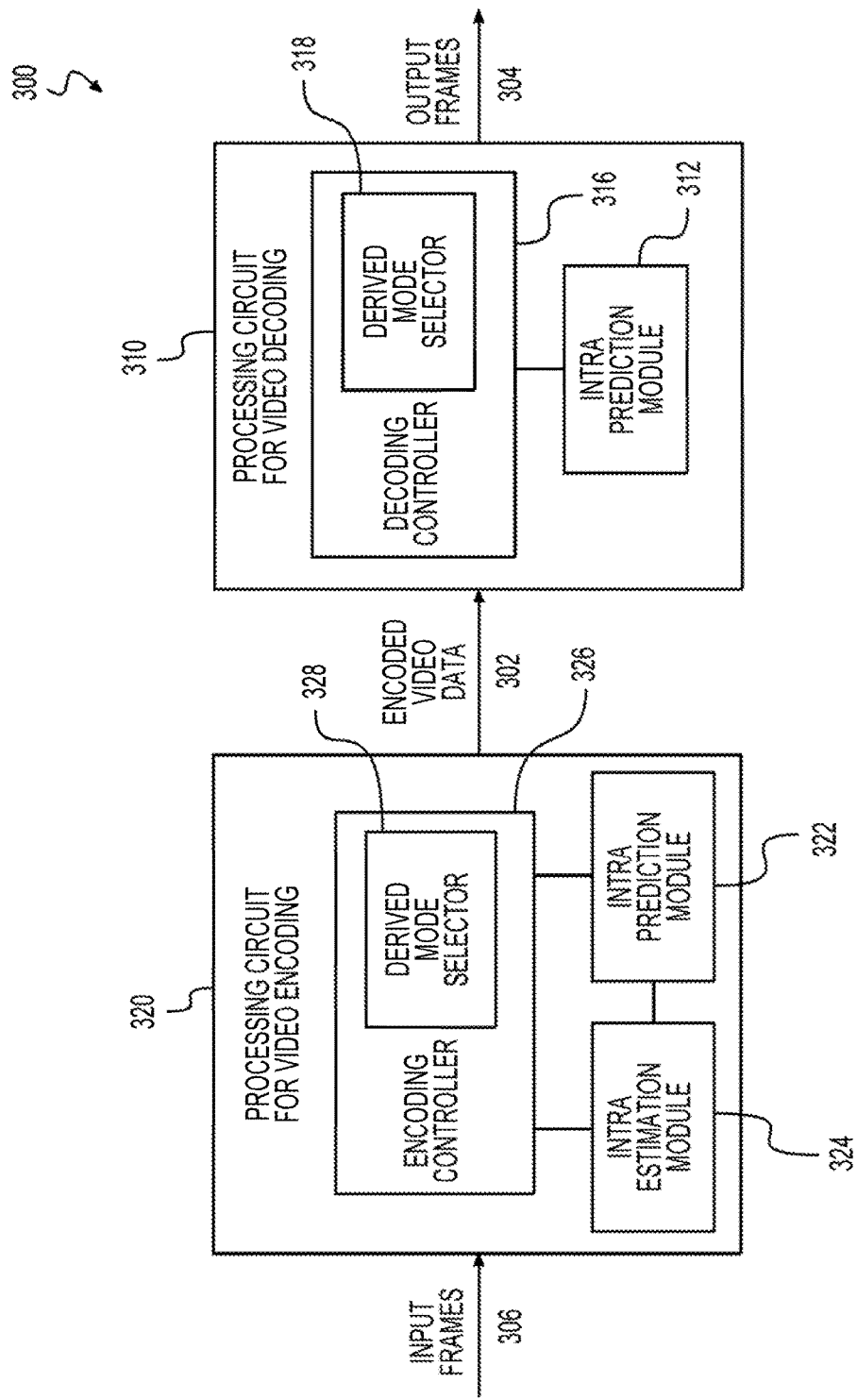
FIG. 3 shows an exemplary functional block diagram of a video coding system according to an embodiment of the disclosure.

FIG. 3 shows an exemplary functional block diagram of a video coding system 300 according to an embodiment of the disclosure. The video coding system 300 includes a processing circuit for video decoding (i.e., a decoding circuit) 310 and a processing circuit for video encoding (i.e., an encoding circuit) 320. The encoding circuit 320 receives input frames 306 as input data and generates encoded video data 302 by encoding the input frames 306. The decoding circuit 310 receives the encoded video data 302 as input data and generates output frames 304 by decoding the encoded video data 302. The video coding system 300 may be implemented by one or more video coding devices that can include the decoding circuit 310, the encoding circuit 320, or both the decoding circuit 310 and encoding circuit 320.

The decoding circuit 310 may include at least an intra prediction module 312 and a decoding controller 316, and the decoding controller 316 may further include a derived mode selector 318. The intra prediction module 312 can generate an intra predictor of a current prediction block, which constitutes in whole or in part a prediction portion of a current coding block within a current coding tree structure using intra prediction. In some examples using the QTBT partitioning structure, a prediction block is the same a coding block, and the terminologies thus may be used interchangeably.

The intra predictor may be generated based on samples of neighboring pixels adjacent to the current prediction block and an intra prediction mode, which may be dictated by the encoded video data 302. In some examples, the intra prediction mode may be determined based on a derived intra prediction mode, which is determined based on the intra prediction mode(s) of another coding tree structure (i.e., a reference coding tree structure), where the current coding tree structure and the reference coding tree structure belong to the same CTU of an image frame.

The derived mode selector 318 can determine the derived intra prediction mode for processing the current prediction block using an approach as illustrated with reference to FIGS. 2A-2C. The decoding controller 316 can oversee the decoding of the encoded video data 302, including determining whether to use the intra prediction module 312 to decode the current prediction block, determining whether to determine the derived intra prediction mode, controlling the operation of the derived mode selector 318, and/or controlling the operation of the intra prediction module 312. In some examples, the decoding controller 316 receives the encoded video data 302 associated with the current prediction block and extracts information therefrom regarding whether to use the intra prediction module 312, the corresponding intra prediction mode, and/or whether to determine the intra prediction mode based on a derived intra prediction mode. In some examples, the above-noted information may be explicitly specified in the encoded video data 302 or derived based on the encoded video data 302 and a predetermined video coding standard.

Although the derived mode selector 318 is depicted in FIG. 3 as part of the decoding controller 316, the derived mode selector 318 may be implemented as a stand-alone circuit or as part of the intra prediction module 312.

The encoding circuit 320 may include at least an intra prediction module 322, an intra estimation module 324, and an encoding controller 326, where the encoding controller 326 may further include a derived mode selector 328. The intra estimation module 324 can analyze the input frames 306 and determine prediction parameters for encoding a current prediction block using intra prediction, where the current prediction block constitutes in whole or in part a prediction portion of a current coding block within a current coding tree structure. In some examples using the QTBT partitioning structure, a prediction block is the same a coding block, and the terminologies thus may be used interchangeably.

The prediction parameters may include an intra prediction mode for generating an intra predictor of the current prediction block. The prediction parameters selected or identified by the intra estimation module 324 may be forwarded to the encoding controller 326, and the encoding controller 326 may determine whether to encode the current prediction block using the intra prediction and encode the prediction parameters as part of the encoded video data 302 if the current prediction block is to be coded using the intra prediction. The prediction parameters selected or identified by the intra estimation module 324 may also be forwarded to the intra prediction module 322 to generate the intra predictor of the current prediction block.

In some examples, the intra estimation module 324 may work with the derived mode selector 328 such that the intra prediction mode may be determined based on a derived intra prediction mode. The derived intra prediction mode can be determined based on the intra prediction mode(s) of another coding tree structure (i.e., a reference coding tree structure), where the current coding tree structure and the reference coding tree structure belong to the same CTU of an image frame. The derived mode selector 328 can determine the derived intra prediction mode for processing the current prediction block using an approach as illustrated with reference to FIGS. 2A-2C.

The intra prediction module 322 can generate the intra predictor of the current prediction block in a manner similar to the operation of the intra prediction module 312 for further encoding process. Moreover, the encoding controller 326 can oversee the encoding of the current prediction block, including determining whether to use the intra estimation module 324, whether to determine the derived intra prediction mode, controlling the operation of the derived mode selector 328, and/or controlling the operation of the intra estimation module 324 and the intra prediction module 322 to encode the current block.

Although the derived mode selector 328 is depicted in FIG. 3 as part of the encoding controller 326, the derived mode selector 328 may be implemented as a stand-alone circuit, as part of the intra estimation module 324, or as part of the intra prediction module 322. Also, in some examples using the QTBT partitioning structure, a prediction block is the same a coding block, and the terminologies thus may be used interchangeably.

Figure 4:
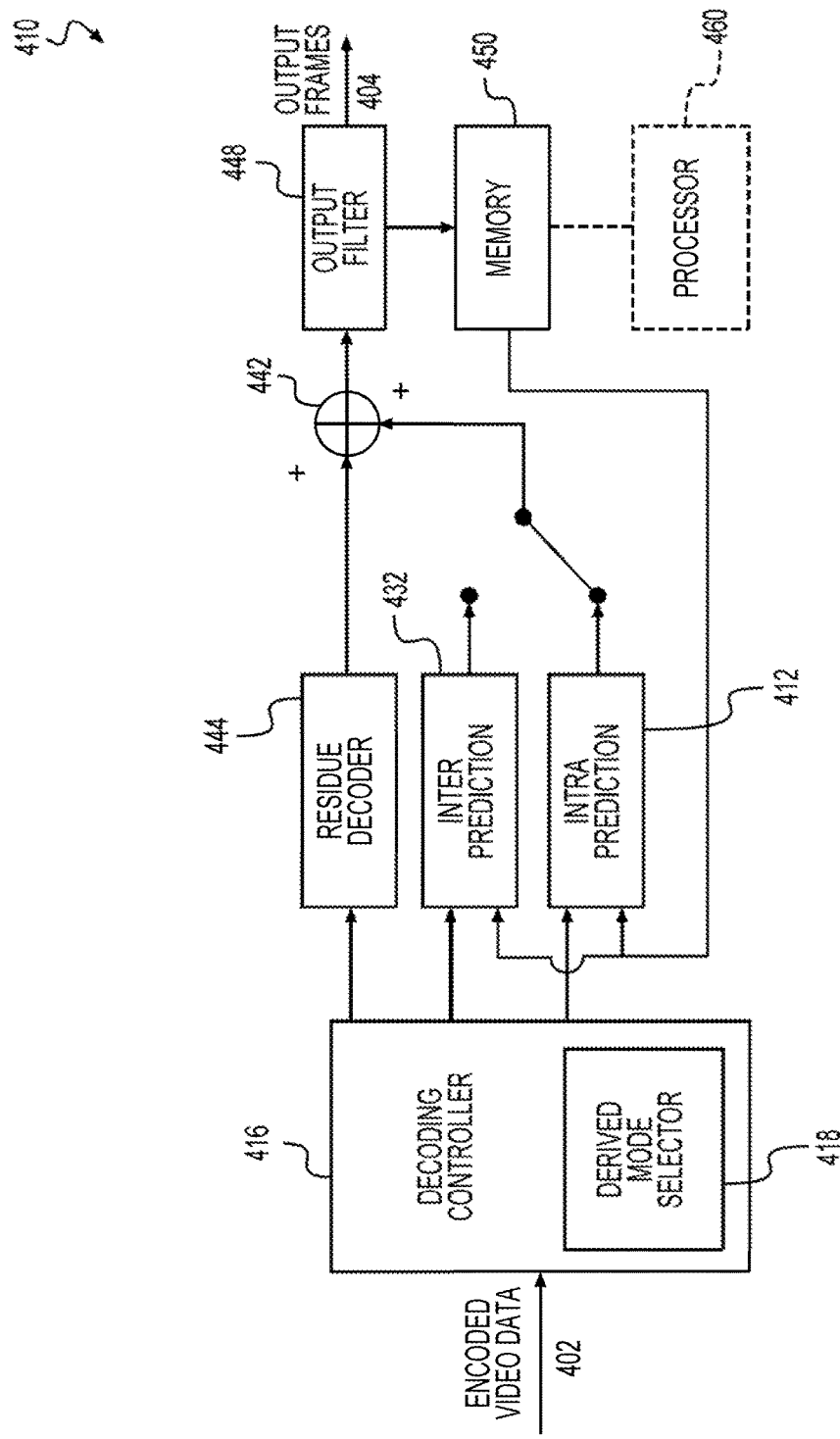
FIG. 4 shows a functional block diagram of an exemplary decoding circuit in the video coding system in FIG. 3 according to an embodiment of the disclosure.

FIG. 4 shows a functional block diagram of an exemplary decoding circuit 410 in a video coding system, such as the decoding circuit 310 in the video coding system 300 in FIG. 3, according to an embodiment of the disclosure. FIG. 4 is a simplified illustration of the decoding circuit 410 and thus may not show all the details and variations of the decoding circuit 410.

The decoding circuit 410 includes an intra prediction module 412, a decoding controller 416, and a derived mode selector 418 as part of the decoding controller 416, which may correspond to the intra prediction module 312, the decoding controller 316, and the derived mode selector 318 in FIG. 3, respectively. The intra prediction module 412 may generate an intra predictor of a current prediction block of a coding block within a current coding tree structure based on an specified intra prediction mode, should the decoding controller 416 determine that the current prediction block is to be decoded using the intra prediction. In some examples, the intra prediction mode may be determined based on at least a derived intra prediction mode, which can be determined based on the intra prediction mode(s) of another coding tree structure (i.e., a reference coding tree structure) in a manner as illustrated with reference to FIGS. 2A-2C.

The decoding circuit 410 also includes an inter prediction module 432, an adder 442, a residue decoder 444, an output filter 448, a memory 450, and a processor 460. The inter prediction module 432 may generate an inter predictor of the current prediction block based on specified motion information when the current prediction block is to be decoded using the inter prediction. The residue decoder 444 can generate the residual portion of the corresponding coding block according to the residue information from the decoding controller 416. The adder 442 may generate a decoded image by adding at least the residual portion of the corresponding coding block from the residue decoder 444 and prediction portion of the coding block. The prediction portion of the coding block may include intra predictor(s) from the intra prediction module 412 and/or inter predictor(s) from the inter prediction module 432. The output filter 448 combines decoded coding blocks from the adder 442 into decoded image frames, processes the decoded image frames according to a predetermined filtering process, and output the filtered image frames as the output frames 404. The memory 450 can store filtered image frames from the output filter 448 and/or previously decoded coding blocks of a current image frame from the prediction modules 412 or 432, which can be further used by the prediction modules 412 or 432 for retrieving reference samples.

The decoding controller 416 receives and analyzes the encoded video data 402 and extracts residue information and prediction parameters of a coding block. The decoding controller 416 may provide the residue information to the residue decoder 444 and provide the prediction parameters to the intra prediction module 412 and/or the inter prediction module 432 in order to reconstruct the image of the coding block. In some examples, when a prediction block of the coding block is to be decoded using the intra prediction and the intra prediction mode is to be determined based on at least a derived intra prediction mode, the intra prediction module 412 may work with the derived mode selector 418 in order to identify one or more suitable reference unit cells of the reference coding tree structure in order to determine the derived intra prediction mode for processing the current prediction block in a manner as illustrated with reference to FIGS. 2A-2C. Of course, in some examples using the QTBT partitioning structure, a prediction block is the same a coding block, and the terminologies thus may be used interchangeably.

Although the derived mode selector 418 is depicted in FIG. 4 as part of the decoding controller 416, the derived mode selector 418 may be implemented as a stand-alone circuit or as part of the intra prediction module 412.

In operation, the decoding controller 416 receives the encoded video data 402 associated with a current coding tree structure and a reference coding tree structure associated with the same CTU in an image frame as input data. When a coding block of the current coding tree structure is to be decoded, the decoding controller 416 extracts information with respect to whether one or more of prediction blocks of the coding block are to be decoded using the inter prediction or the intra prediction. When the decoding controller 416 determines that a current prediction block of the coding block is to be decoded using the intra prediction, the decoding controller 416 may further determine the intra prediction mode for processing the current prediction block. In some examples, the decoding controller 416 may control the derived mode selector 418 to determine a derived intra prediction mode based on intra prediction mode(s) used in the reference coding tree structure. The decoding controller 416 may forward prediction parameters of the current prediction block to the intra prediction module 412. The prediction parameters may include an intra prediction mode or the determined derived intra prediction mode for generating an intra predictor of the current prediction block. The prediction parameters selected or identified by the decoding controller 416 may be explicitly specified in the encoded video data 402 or derived based on information provided in the encoded video data 402 and a predetermined video coding standard.

The intra prediction module 412 may generate the intra predictor of the current prediction block according to samples of neighboring pixels and the intra prediction mode and/or derived intra prediction mode provided by the decoding controller 416. The intra prediction module 412 may further generate other intra predictor(s) of the corresponding coding block. In some examples, the inter prediction module 432 may generate one or more inter predictors of the corresponding coding block, if applicable. On the other hand, the decoding controller 416 also forwards the residue information to the residue decoder 444, where a residual portion of the corresponding coding block is generated. The coding block can now be decoded by adding the residual portion and the prediction portion that incorporates one or more predictors from the prediction modules 412 and 432 of the coding block at the adder 442.

The derived mode selector 418 may determine a derived mode intra prediction mode for a current prediction block based on the intra prediction mode(s) used by the reference coding tree structure. In some examples, the reference coding tree structure may correspond to a first color space component, such as the luma component (Y) in the YCbCr color space; and the current coding tree structure may correspond to a second color space component, such as the blue-difference chroma component (Cb) or the red-difference chroma component (Cr) in the YCbCr color space. The derived mode selector 418 may identify a reference region in the reference coding tree structure, where the reference region and the current prediction block correspond to the same region in the image frame. The derived mode selector 418 may further divide the reference region into one or more unit cells, and may then identify one or more reference unit cell in a manner as illustrated with reference to FIGS. 2A-2C.

For example, the identified reference unit cells may include two or more unit cells clustered about one or more of a center or corners of the reference region. In some examples, the identified reference unit cells may include unit cells locate at predetermined positions in the reference region. Also, the identified reference unit cell may include a single unit cell at or adjacent to the center of the reference region. The derived intra prediction mode may be determined based on the intra prediction mode(s) for processing the identified reference unit cell(s). In at least one example, a most frequent intra prediction mode among the identified intra prediction modes can be set as the derived intra prediction mode for the current prediction block. Of course, in some examples using the QTBT partitioning structure, a prediction block is the same a coding block, and the terminologies thus may be used interchangeably.

Moreover, as shown in FIG. 4, the processor 460 is electrically coupled with the memory 450 and can be configured to execute program instructions stored in the memory 450 to perform various functions. The processor 460 can include a single or multiple processing cores. Various components of the decoding circuit 410, such as the decoding controller 416, derived mode selector 418, intra prediction module 412, inter prediction module 432, adder 442, residue decoder 444, and/or output filter 448, may be implemented by hardware components, the processor 460 executing the program instructions, or a combination thereof. Of course, the processor 460 can also execute program instructions to control receiving of the encoded video data 402 and the output or display of the output frames 404. In some examples, the processor 460 can execute program instructions to perform functions that may not be directly related to decoding the encoded video data 402.

The memory 450 can be used to store the program instructions, information corresponding to the prediction parameters, previously decoded blocks, output frames, and/or intermediate data for performing various functions of the decoding circuit 410. In some examples, the memory 450 includes a non-transitory computer readable medium, such as a semiconductor or solid-state memory, a random access memory (RAM), a read-only memory (ROM), a hard disk, an optical disk, or other suitable storage medium. In some embodiments, the memory 450 includes a combination of two or more of the non-transitory computer readable mediums listed above.

Figure 5:
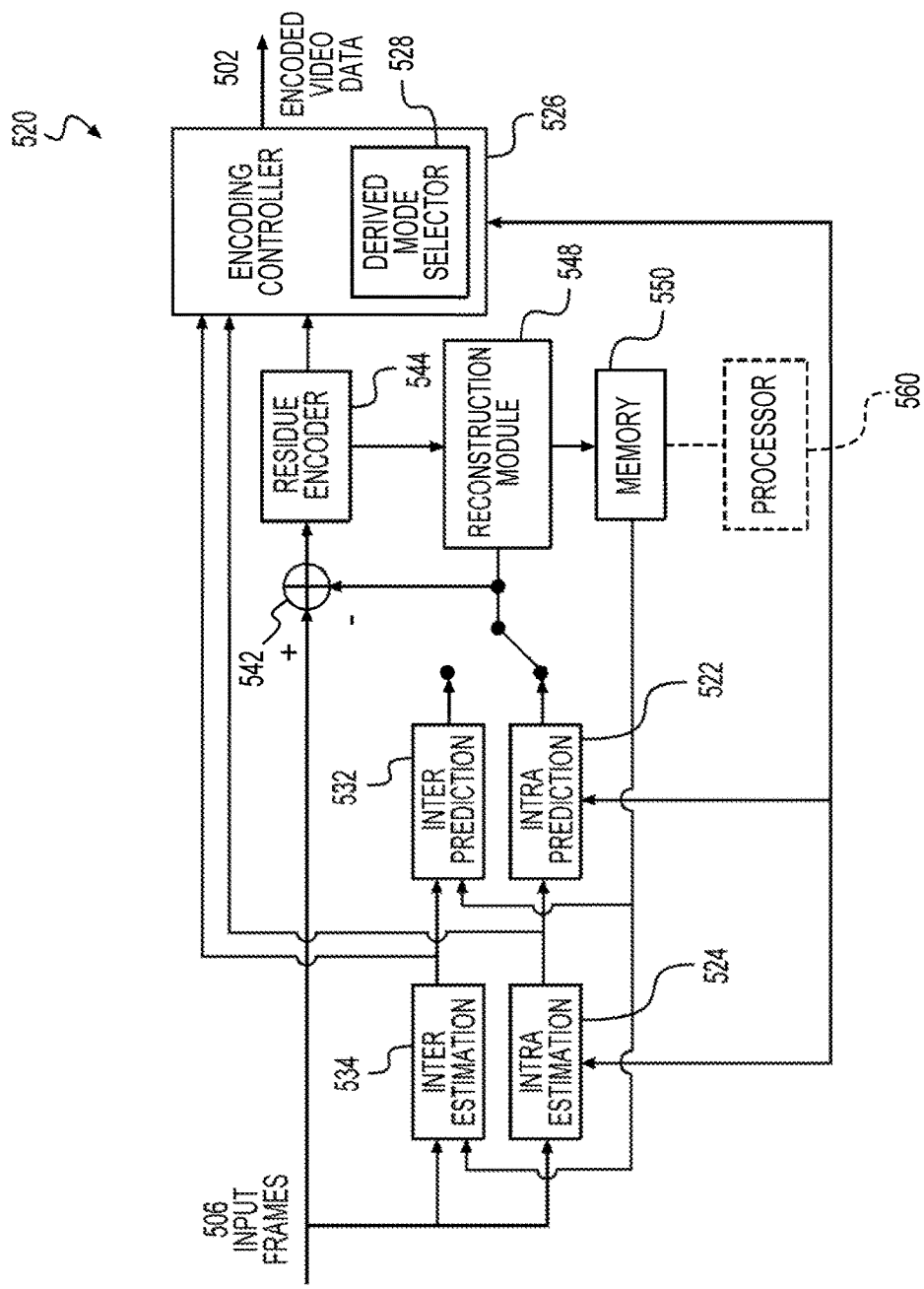
FIG. 5 shows a functional block diagram of an exemplary encoding circuit in the video coding system in FIG. 3 according to an embodiment of the disclosure.

FIG. 5 shows a functional block diagram of an exemplary encoding circuit 520 in a video coding system, such as the encoding circuit 320 in the video coding system 300 in FIG. 3, according to an embodiment of the disclosure. FIG. 5 is a simplified illustration of the encoding circuit 520 and thus may not show all the details and variations of the encoding circuit 520.

The encoding circuit 520 includes an intra prediction module 522, an intra estimation module 524, an encoding controller 526, and a derived mode selector 528 as part of the encoding controller 526, which may correspond to the intra prediction module 322, the intra estimation module 324, the encoding controller 326, and the derived mode selector 328 in FIG. 3, respectively. The encoding circuit 520 also includes an inter prediction module 532, an inter estimation module 534, an adder 542, a residue encoder 544, a reconstruction module 548, a memory 550, and a processor 560.

The encoding controller 526 supervises the operation of the intra prediction module 522, intra estimation module 524, inter prediction module 532, inter estimation module 534, and derived mode selector 528. The encoding controller 526 may divide each input frame into coding blocks. In some examples, the encoding controller 526 may further instruct the intra estimation module 524, inter estimation module 534, and/or derived mode selector 528 to divide a coding block into one or more prediction blocks and to determine the prediction scheme, prediction mode, and/or corresponding prediction parameters for each block. In some examples using the QTBT partitioning structure, a prediction block is the same a coding block, and the terminologies thus may be used interchangeably. The encoding controller 526 may select a prediction block partition and corresponding prediction schemes accordingly.

The encoding controller 526 may further instruct the intra prediction module 522 and/or inter prediction module 532 to output corresponding predictors that constitute a prediction portion of a corresponding coding block to the adder 542. The adder 542 receives an original image of the coding block and the predictor(s) of the coding block and outputs a residual portion of the coding block by subtracting the predictor(s) from the original image of the coding block. The residue encoder 544 receives and encodes the residual portion of the coding block. The encoding controller 526 may generate the encoded video data 502 based on the prediction parameters from the intra estimation module 524, inter estimation module 534, the derived mode selector 528, and/or the output from the residue encoder 544.

The intra prediction module 522 and the inter prediction module 532 may receive prediction parameters from the intra estimation module 524 and inter estimation module 534, respectively, and may generate suitable predictors for the coding block in a manner similar to the operations of the intra prediction module 412 and inter prediction module 432 in FIG. 4. Moreover, the derived mode selector 528 may determine the derived intra prediction mode for a current prediction block in a manner similar to the operations of the derived mode selector 418 in FIG. 4. Detailed description thereof is thus omitted.

In some examples, the encoding controller 526 may control the intra estimation module 524, inter estimation module 534, intra prediction module 522, inter prediction module 532, the derived mode selector 528, and/or the residue encoder 544 to encode the coding block based on different prediction schemes and parameters and then may select an optimal combination of encoding scheme and parameters for encoding the current block.

The reconstruction module 548 may receive the predictor(s) from the intra prediction module 522 and/or the intra prediction module 532 and a reconstructed residual portion of the coding block from the residue encoder 544. Based on such information, the reconstruction module 548 may generate a reconstructed image of the coding block and/or reconstructed frames in a manner similar to the operations of the adder 442 and the output filter 448 in FIG. 4. The reconstructed blocks and/or frames can be stored in the memory 550 and are accessible by the intra prediction module 522, inter prediction module 532, intra estimation module 524, and/or inter estimation module 534 for estimating prediction parameters for a next prediction block.

In operation, the encoding circuit 520 receives input frames 506 including an image frame to be encoded, which is further divided into at least a current coding tree structure and a reference coding tree structure that correspond to the same CTU. When a coding block of the current coding tree structure is to be encoded, the intra estimation module 524 and the inter estimation module 534 may receive the original image of the coding block from the input frames 506. The intra estimation module 524 and the inter estimation module 534 may analyze the original image of the coding block and output candidate prediction parameter for generating a prediction portion of the coding block. In some examples, the intra estimation module 524 may work with the derived mode selector 528 to consider a derived intra prediction mode based on intra prediction mode(s) used in the reference coding tree structure in a manner as illustrated with reference to FIGS. 2A-2C. In some examples using the QTBT partitioning structure, a prediction block is the same a coding block, and the terminologies thus may be used interchangeably.

The intra estimation module 524 and/or the inter estimation module 534 then send the prediction parameters to the encoding controller 526 and the corresponding prediction modules 522 and 532. The coding controller 526 may determine an optimal prediction scheme and instruct the suitable prediction modules 522 and 532 to generate a predictor accordingly. In some examples, the intra prediction module 522 may generate an intra predictor of the current prediction block based on the prediction parameters provide by the intra estimation module 524. The intra prediction module 522 may generate the intra predictor of the current prediction block according to samples of neighboring pixels and the intra prediction mode. The coding controller may encode the intra prediction mode by providing an indicator in the encoded video data 502 to explicitly signal the intra prediction mode or as a derived intra prediction mode without providing such indicator in the encoded video data 502.

After the generation of the predictor(s) for the coding block, the intra prediction module 522 and/or the inter prediction module 524 output the predictor(s) to the adder 542 and the reconstruction module 548. The adder 542 may output a residual portion of the coding block based on the original image of the coding block and the generated predictor(s), and encode the residual portion according to a predetermined video coding standard. The encoding controller 526 may collect the prediction parameters from the intra estimation module 524 and/or the inter estimation module 534 and the encoded residual information from the residue encoder 544 and determine whether the selected coding scheme for the coding block is acceptable. The reconstruction module 548 may output a reconstructed image of the coding block based on the predictor(s) from the intra prediction module 522 and/or the intra prediction module 532 and a reconstructed residual portion from the residue encoder 544.

Moreover, as shown in FIG. 5, the processor 560 is electrically coupled with the memory 550 and can be configured to execute program instructions stored in the memory 550 to perform various functions. The processor 560 can include a single or multiple processing cores. Various components of the encoding circuit 520, such as the encoding controller 526, intra prediction module 522, intra estimation module 524, inter prediction module 532, inter estimation module 534, the derived mode selector 528, adder 542, residue encoder 544, and/or reconstruction module 548, may be implemented by hardware components, the processor 560 executing the program instructions, or a combination thereof. Of course, the processor 560 can also execute program instructions to control receiving of the input frames 506 and the output of the encoded video data 502. In some examples, the processor 560 can execute program instructions to perform functions that may not be directly related to encoding the encoded video data 502.

The memory 550 can be used to store the program instructions, information corresponding to the prediction parameters reconstructed blocks, input frames, and/or intermediate data for performing various functions of the encoding circuit 520. In some examples, the memory 550 includes a non-transitory computer readable medium, such as a semiconductor or solid-state memory, a random access memory (RAM), a read-only memory (ROM), a hard disk, an optical disk, or other suitable storage medium. In some embodiments, the memory 550 includes a combination of two or more of the non-transitory computer readable mediums listed above.

Moreover, the decoding circuit 410 in FIG. 4 and the encoding circuit 520 in FIG. 5 may be implemented in the same electronic device, and various components of the decoding circuit 410 and the encoding circuit 520 may be shared or reused. For example, one or more of the memory 450, processor 460, intra prediction module 412, inter prediction module 432, derived mode selector 418, and output filter 448 in the decoding circuit 410 may also be used to function as the memory 550, processor 560, intra prediction module 522, inter prediction module 532, derived mode selector 528, and reconstruction module 548 in the encoding circuit 520, respectively.

Figure 6A:
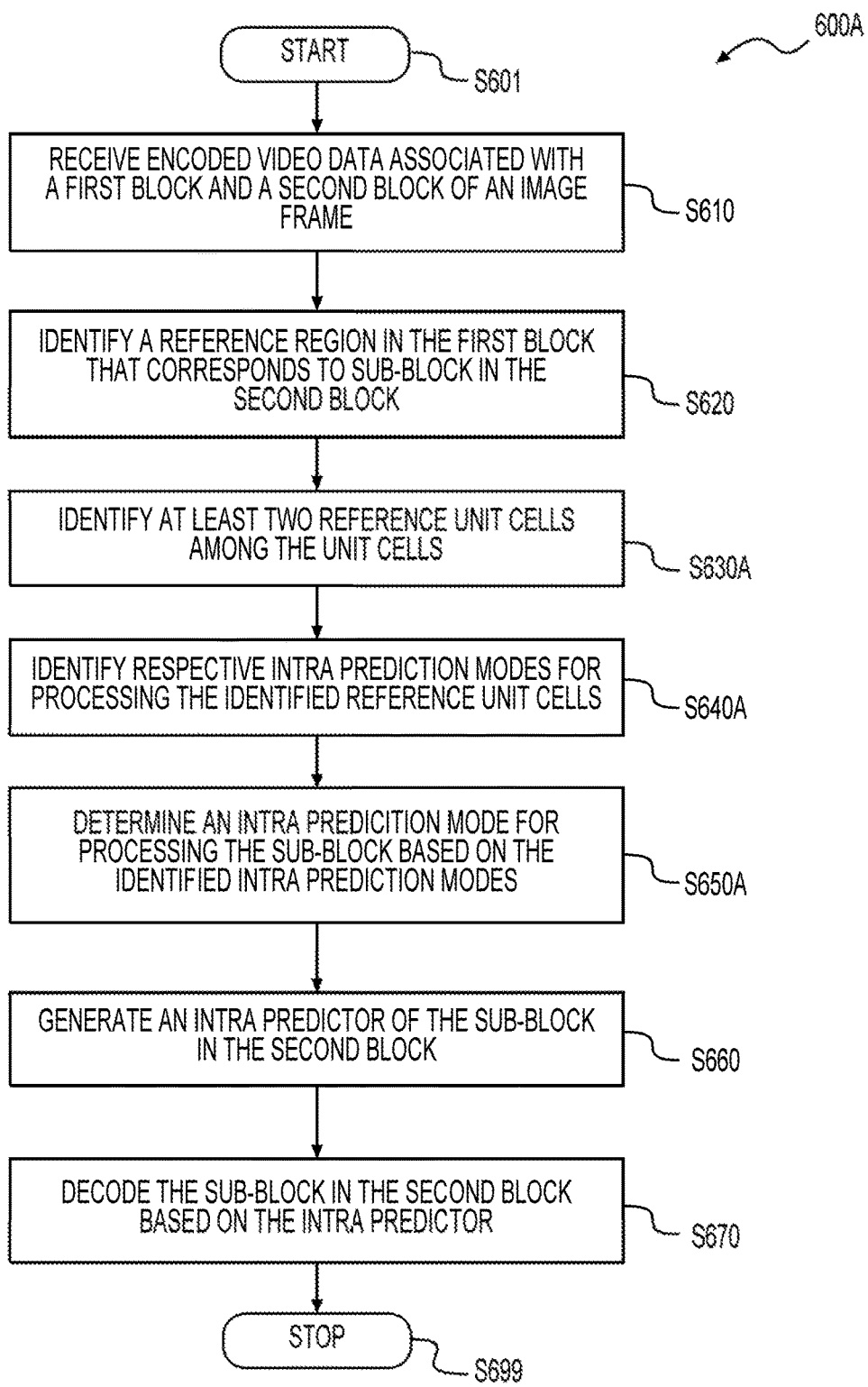
FIG. 6A shows a flow chart outlining an exemplary video decoding process, including determining a derived intra prediction mode as illustrated with reference to FIG. 2A, according to an embodiment of the disclosure.

FIG. 6A shows a flow chart outlining an exemplary video decoding process 600A, including determining a derived intra prediction mode as illustrated with reference to FIG. 2A, according to an embodiment of the disclosure. In some examples, process 600A may be performed using a processing circuit for video decoding, such as the processing circuit in FIG. 4. It is understood that additional operations may be performed before, during, and/or after the process 600A depicted in FIG. 6A. The process 600A starts at S601 and proceeds to S610.

At S610, encoded video data associated with a first block and a second block of an image frame are received as input data. The first block corresponds to a first color space component of a predetermined color space, and the second block corresponds to a second color space component of the predetermined color space. In some examples, the first block and the second block are different coding tree structures corresponding to a same CTU of the image frame. In some examples, when the predetermined color space is the YCbCr color space, the first color space component may be the luma component (Y), and the second color space component may be the blue-difference chroma component (Cb) or the red-difference chroma component (Cr). For example, the decoding controller 416 may receive the encoded video data 402 that includes the input data associated with the first block and the second block.

At S620, when a sub-block of the second block is encoded using an intra prediction and the intra prediction mode is a derived intra prediction mode or selected from candidate intra prediction modes that include the derived intra prediction mode, a reference region in the first block may be identified. In some examples, the reference region and the sub-block in the second block correspond to a same region in the image frame. Moreover, the reference region may be partitioned into a plurality of unit cells. In some examples, a size of each unit cell may be determined based on a size of a minimum coding block or a width and a height of a minimum coding block according to a predetermined video coding standard. For example, the derived mode selector 418 or the decoding controller 416 may identify the reference region in the reference coding tree structure as illustrated with reference to FIG. 2A.

At S630A, at least two reference unit cells among the plurality of unit cells in the reference region are identified. In some examples, the identified reference unit cells may include two or more unit cells clustered about one or more of a center or corners of the reference region as illustrated with reference to FIG. 2A. In some examples, the identified reference unit cells may include unit cells locate at predetermined positions in the reference region. For example, the derived mode selector 418 or the decoding controller 416 may identify the reference unit cells in the reference region in a manner as illustrated with reference to FIG. 2A.

At S640A, respective intra prediction modes for processing the identified reference unit cells are further identified. At S650A, a derived intra prediction mode is determined based on the identified intra prediction modes, and an intra prediction mode for processing the sub-block in the second block can be determined based on the derived intra prediction mode. In some examples, a most frequent intra prediction mode among the identified intra prediction modes can be set as the derived intra prediction mode. For example, the derived mode selector 418 may identify intra prediction modes for processing the identified reference unit cells and determine the derived intra prediction mode in a manner as illustrated with reference to FIG. 2A. Moreover, the decoding controller 416 may further determine the intra prediction mode for processing the sub-block in the second block based on the derived intra prediction mode.

At S660, an intra predictor of the sub-block in the second block is generated using the determined intra prediction mode. For example, the intra prediction module 412 may generate the intra predictor of the sub-block of the second block using the intra prediction mode provided by the decoding controller 416.

At S670, the sub-block in the second block is decoded based on the intra predictor for output. For example, the adder 442 may generate a decoded block of the second block based on combining the residual portion(s) and the prediction portion(s) of the second block, where the prediction portion(s) include at least the intra predictor of the sub-block from the intra prediction module 412.

After S670, the process proceeds to S699 and terminates.

Figure 6B:
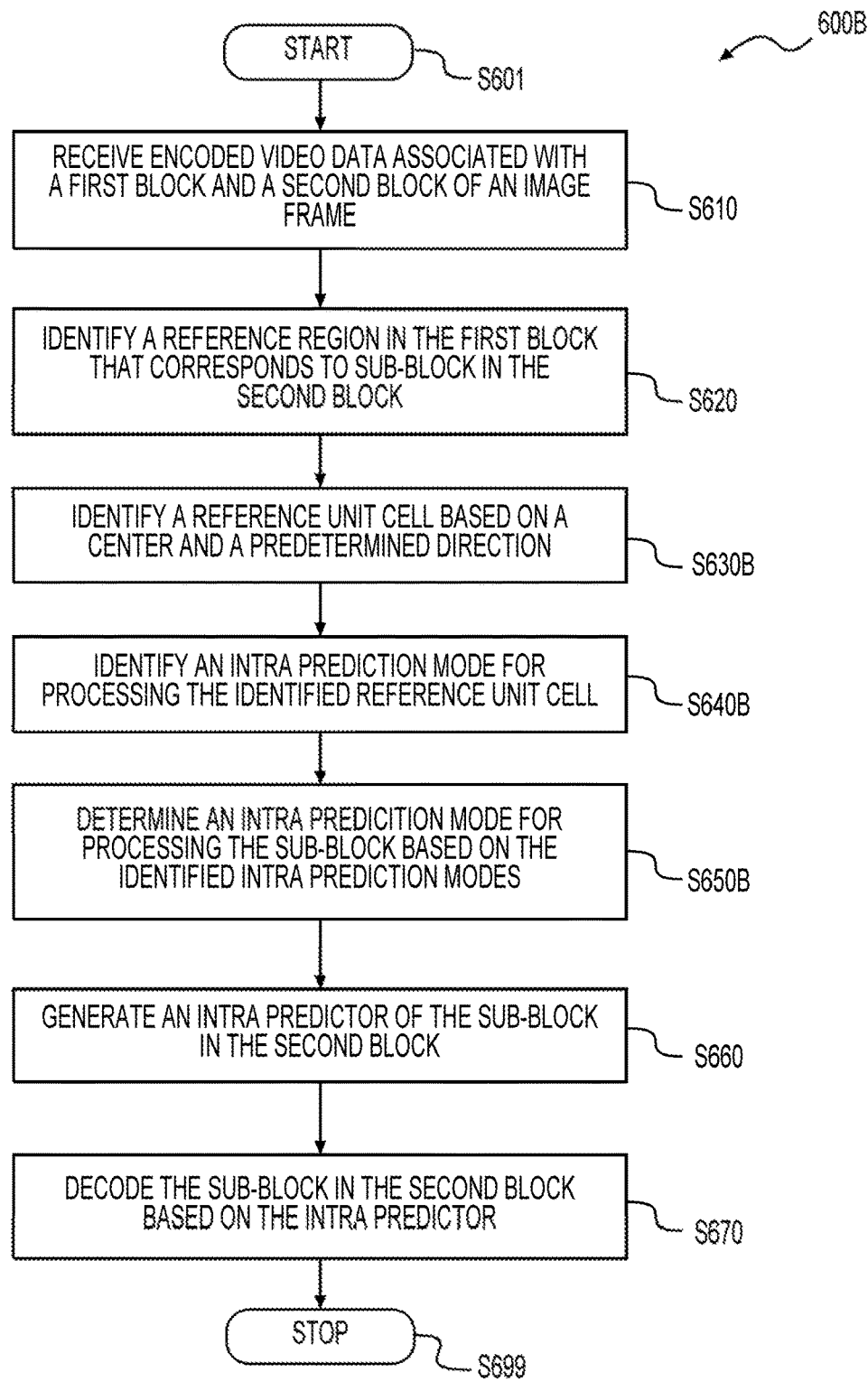
FIG. 6B shows a flow chart outlining another exemplary video decoding process, including determining a derived intra prediction mode as illustrated with reference to FIG. 2B, according to an embodiment of the disclosure.

FIG. 6B shows a flow chart outlining another exemplary video decoding process 600B, including determining a derived intra prediction mode as illustrated with reference to FIG. 2B, according to an embodiment of the disclosure. In some examples, process 600B may be performed using a processing circuit for video decoding, such as the processing circuit in FIG. 4. It is understood that additional operations may be performed before, during, and/or after the process 600B depicted in FIG. 6B.

The elements depicted in FIG. 6B that are the same or similar to the elements in FIG. 6A are given the same reference numbers, and detail description thereof is thus omitted. Compared with the process 600A, the process 600B replaces S630A, S640A, and S650A with S630B, S640B, and S650B, respectively.

At S630B, a reference unit cell among one or more unit cells in the reference region is identified based on a center of the reference region and a predetermined direction. In some examples, the identified reference unit cell is a closest unit cell to the center of the reference region in the predetermined direction as illustrated with reference to FIG. 2B. For example, the derived mode selector 418 or the decoding controller 416 may identify the reference unit cell in the reference region in a manner as illustrated with reference to FIG. 2B.

At S640B, the intra prediction mode for processing the identified reference unit cell is identified. At S650B, the identified intra prediction mode is set as a derived intra prediction mode, and an intra prediction mode for processing the sub-block in the second block can be determined based on the derived intra prediction mode. For example, the derived mode selector 418 may identify an intra prediction mode for processing the identified reference unit cell and set such identified intra prediction mode as the derived intra prediction mode in a manner as illustrated with reference to FIG. 2B. Moreover, the decoding controller 416 may further determine the intra prediction mode for processing the sub-block in the second block based on the derived intra prediction mode.

Figure 7A:
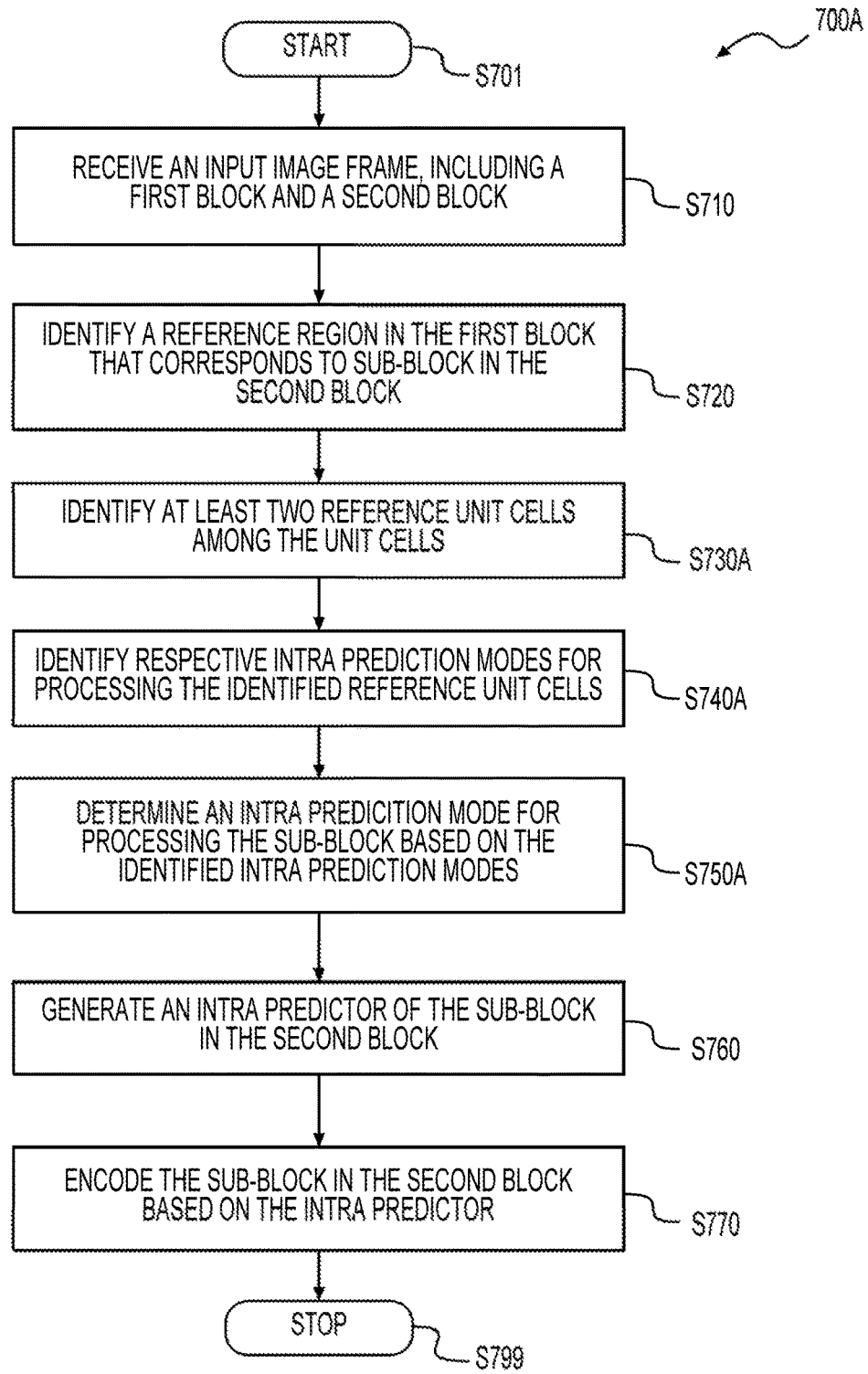
FIG. 7A shows a flow chart outlining an exemplary video encoding process, including determining a derived intra prediction mode as illustrated with reference to FIG. 2A, according to an embodiment of the disclosure.

FIG. 7A shows a flow chart outlining an exemplary video encoding process 700A, including determining a derived intra prediction mode as illustrated with reference to FIG. 2A according to an embodiment of the disclosure. In some examples, process 700A may be performed using a processing circuit for video encoding, such as the processing circuit in FIG. 5. It is understood that additional operations may be performed before, during, and/or after the process 700A depicted in FIG. 7A. The process 700A starts at S701 and proceeds to S710.

At S710, an input image frame to be encoded is received as input data. The image frame includes a first block and a second block, where the first block corresponds to a first color space component of a predetermined color space, and the second block corresponds to a second color space component of the predetermined color space. In some examples, the first block and the second block are different coding tree structures of a same CTU of the image frame. In some examples, when the predetermined color space is the YCbCr color space, the first color space component may be the luma component (Y), and the second color space component may be the blue-difference chroma component (Cb) or the red-difference chroma component (Cr). For example, the processing circuit 520 may receive the input frames 506 that includes the image frame having the first block and the second block.

At S720-S750A, a suitable intra prediction mode for encoding the sub-block of the second block is determined based on a derived intra prediction mode. For example, the intra estimation module 524 together with the derived mode selector 528 estimate the prediction parameters for encoding the sub-block using the intra prediction, including determining the derived intra prediction mode based on intra prediction mode(s) used in the first block in a manner illustrated with reference to FIG. 2A.

At S720, when the sub-block of the current coding tree structure is to be encoded using the intra prediction and the intra prediction mode is a derived intra prediction mode or selected from candidate intra prediction modes that include the derived intra prediction mode, a reference region in the first block may be identified as illustrated with reference to S620A in FIG. 6A. For example, the derived mode selector 528 or the encoding controller 526 may identify the reference region in the reference coding tree structure as illustrated with reference to FIG. 2A.

At S730A, at least two reference unit cells among the plurality of unit cells in the reference region are identified as illustrated with reference to S630A in FIG. 6A. For example, the derived mode selector 528 or the encoding controller 526 may identify the reference unit cells in the reference region in a manner as illustrated with reference to FIG. 2A.

At S740A, respective intra prediction modes for processing the identified reference unit cells are further identified as illustrated with reference to S640A in FIG. 6A. At S750A, a derived intra prediction mode is determined based on the identified intra prediction modes as illustrated with reference to S650A in FIG. 6A. An intra prediction mode for processing the sub-block in the second block can thus be determined based on the derived intra prediction mode. For example, the derived mode selector 528 may identify intra prediction modes for processing the identified reference unit cells and determine the derived intra prediction mode in a manner as illustrated with reference to FIG. 2A. Moreover, the encoding controller 526 and/or the intra estimation module 524 may further determine the intra prediction mode for processing the sub-block in the second block based on the derived intra prediction mode.

At S760, the intra predictor of the current sub-block can be generated based on the prediction parameters determined at S720-S750A. For example, the intra prediction module 522 can generate the intra predictor of the current sub-block in the second block based on the prediction parameters provided by the intra estimation module 524.

At S770, if the prediction parameters are determined to be acceptable, the current sub-block is encoded based on the intra predictor and the estimated prediction parameters to output encoded video data. After S770, the process proceeds to S799 and terminates.

Figure 7B:
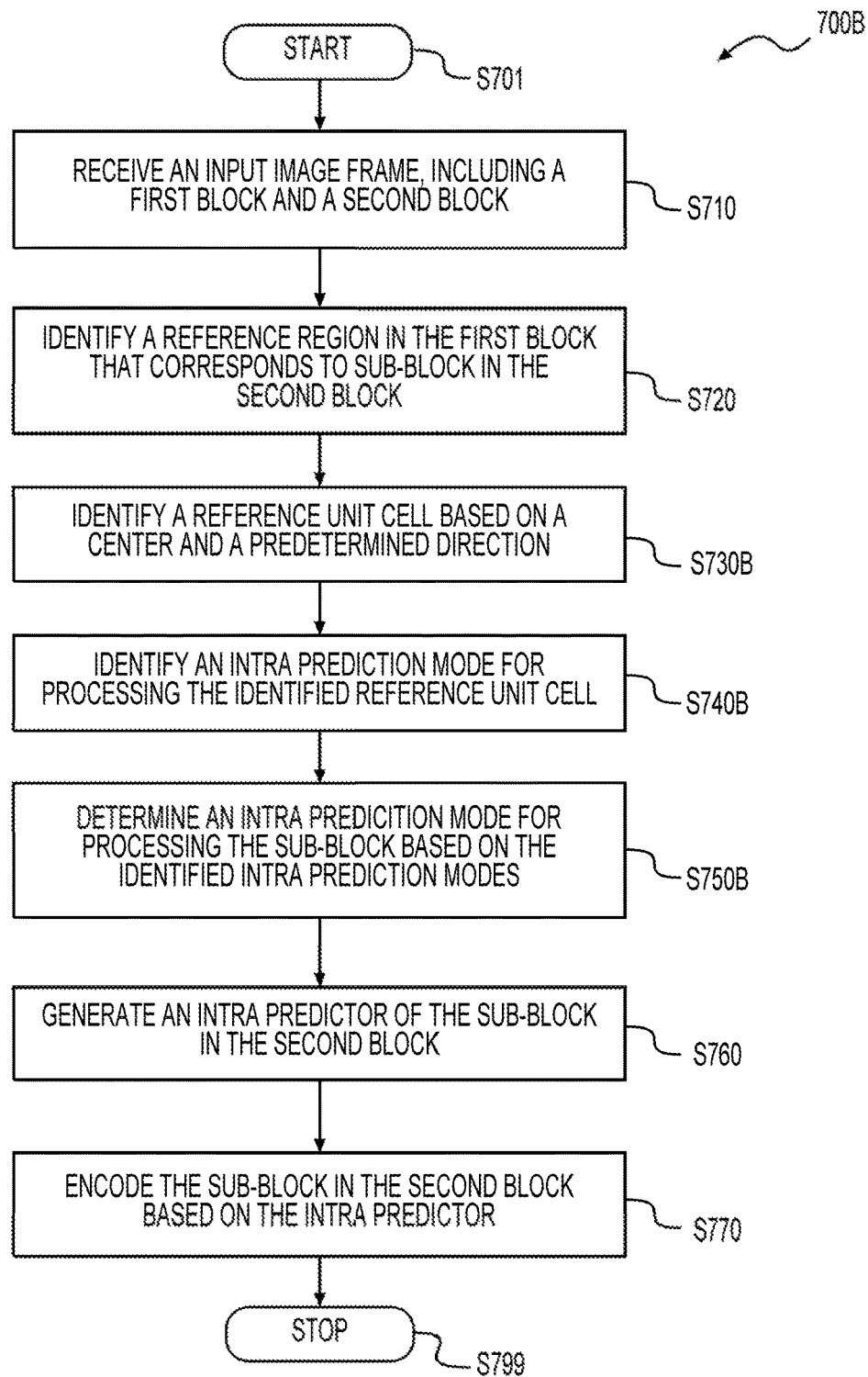
FIG. 7B shows a flow chart outlining another exemplary video encoding process, including determining a derived intra prediction mode as illustrated with reference to FIG. 2B, according to an embodiment of the disclosure.

FIG. 7B shows a flow chart outlining another exemplary video encoding process 700B, including determining a derived intra prediction mode as illustrated with reference to FIG. 2B, according to an embodiment of the disclosure. In some examples, process 700B may be performed using a processing circuit for video encoding, such as the processing circuit in FIG. 5. It is understood that additional operations may be performed before, during, and/or after the process 700B depicted in FIG. 7B.

The elements depicted in FIG. 7B that are the same or similar to the elements in FIG. 7A are given the same reference numbers, and detail description thereof is thus omitted. Compared with the process 700A, the process 700B replaces S730A, S740A, and S750A with S730B, S7408, and S750B, respectively.

At S730B, a reference unit cell among one or more unit cells in the reference region is identified based on a center of the reference region and a predetermined direction. In some examples, the identified reference unit cell is a closest unit cell to the center of the reference region in the predetermined direction as illustrated with reference to FIG. 2B. For example, the derived mode selector 528 or the encoding controller 526 may identify the reference unit cell in the reference region in a manner as illustrated with reference to FIG. 2B.

At S740B, the intra prediction mode for processing the identified reference unit cell is identified. At S750B, the identified intra prediction mode is set as a derived intra prediction mode, and an intra prediction mode for processing the sub-block in the second block can be determined based on the derived intra prediction mode. For example, the derived mode selector 528 may identify an intra prediction mode for processing the identified reference unit cell and set such identified intra prediction mode as the derived intra prediction mode in a manner as illustrated with reference to FIG. 2B. Moreover, the encoding controller 526 and/or the intra estimation module 524 may further determine the intra prediction mode for processing the sub-block in the second block based on the derived intra prediction mode.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of video coding, comprising:
   receiving input data associated with a first block and a second block of an image frame, the first block corresponding to a first color space component of the image frame, and the second block corresponding to a second color space component of the image frame;
   identifying a reference region in the first block according to a sub-block in the second block, the reference region and the sub-block in the second block corresponding to a same region in the image frame, and the reference region being partitioned into a plurality of unit cells of a predetermined size in pixels;
   identifying respective intra prediction modes for processing, using intra prediction coding, at least two reference unit cells among the plurality of unit cells in the reference region, the at least two reference unit cells being at predetermined positions in the reference region;
   determining an intra prediction mode for processing, using the intra prediction coding, the sub-block in the second block based on the identified intra prediction modes;
   generating an intra predictor of the sub-block in the second block based on the determined intra prediction mode; and
   encoding or decoding the sub-block in the second block for output based on the intra predictor of the sub-block in the second block.

2. The method according to claim 1, wherein
   the first color space component is a luma component, and
   the second color space component is a chroma component.

3. The method according to claim 1, wherein determining the intra prediction mode comprises setting a most frequent intra prediction mode among the identified intra prediction modes as the intra prediction mode for processing the sub-block in the second block.

4. The method according to claim 1, wherein determining the intra prediction mode comprises:
   identifying a plurality of most frequent intra prediction modes among the identified intra prediction modes; and
   selecting one of the plurality of most frequent intra prediction modes based on a predetermined order as the intra prediction mode for processing the sub-block in the second block.

5. The method according to claim 1, wherein
   the at least two reference unit cells are at or adjacent to a center of the reference region.

6. The method according to claim 1, wherein
   the at least two reference unit cells include a predetermined number of reference unit cells that are clustered about a center of the reference region.

7. The method according to claim 1, wherein
   the at least two reference unit cells are adjacent to different corners of the reference region, respectively.

8. The method according to claim 1, wherein
   the at least two reference unit cells include multiple groups of reference unit cells that are clustered about different corners of the reference region, respectively.

9. The method according to claim 1, wherein
   the at least two reference unit cells are in at least one predetermined row of the plurality of unit cells; or
   the at least two reference unit cells are in at least one predetermined column of the plurality of unit cells.

10. The method according to claim 1, wherein each unit cell has the predetermined size in pixels equal to a predetermined minimum coding unit size.

11. A video coding apparatus, comprising:
    a processing circuit configured to:
    receive input data associated with a first block and a second block of an image frame, the first block corresponding to a first color space component of the image frame, and the second block corresponding to a second color space component of the image frame;
    identify a reference region in the first block according to a sub-block in the second block, the reference region and the sub-block in the second block corresponding to a same region in the image frame, and the reference region being partitioned into a plurality of unit cells of a predetermined size in pixels;
identify respective intra prediction modes for processing, using intra prediction coding, at least two reference unit cells among the plurality of unit cells in the reference region, the at least two reference unit cells being at predetermined positions in the reference region;
determine an intra prediction mode for processing, using the intra prediction coding, the sub-block in the second block based on the identified intra prediction modes;
generate an intra predictor of the sub-block in the second block based on the determined intra prediction mode; and
encode or decode the sub-block in the second block for output based on the intra predictor of the sub-block in the second block.

12. The video coding apparatus according to claim 11, wherein, when determining the intra prediction mode, the processing circuitry is configured to set a most frequent intra prediction mode among the identified intra prediction modes as the intra prediction mode for processing the sub-block in the second block.

13. The video coding apparatus according to claim 11, wherein, when determining the intra prediction mode, the processing circuitry is configured to:
identify a plurality of most frequent intra prediction modes among the identified intra prediction modes; and
select one of the plurality of most frequent intra prediction modes based on a predetermined order as the intra prediction mode for processing the sub-block in the second block.

14. The video coding apparatus according to claim 11, wherein the processing circuitry is configured to include a predetermined number of reference unit cells that are clustered about a center of the reference region in the at least two reference unit cells.

15. The video coding apparatus according to claim 11, wherein the processing circuitry is configured to include multiple groups of reference unit cells that are clustered about different corners of the reference region, respectively, in the at least two reference unit cells.

16. The video coding apparatus according to claim 11, wherein the processing circuitry is configured to:
identify the at least two reference cells from at least one predetermined row of the plurality of unit cells; or
identify the at least two reference cells from at least one predetermined column of the plurality of unit cells.

17. A non-transitory computer readable medium storing program instructions for causing a processing circuit of an apparatus to perform a video coding method, and the method comprising:
receiving input data associated with a first block and a second block of an image frame, the first block corresponding to a first color space component of the image frame, and the second block corresponding to a second color space component of the image frame;
identifying a reference region in the first block according to a sub-block in the second block, the reference region and the sub-block in the second block corresponding to a same region in the image frame, and the reference region being partitioned into a plurality of unit cells of a predetermined size in pixels;
identifying respective intra prediction modes for processing, using intra prediction coding, at least two reference unit cells among the plurality of unit cells in the reference region, the at least two reference unit cells being at predetermined positions in the reference region;
determining an intra prediction mode for processing, using the intra prediction coding, the sub-block in the second block based on the identified intra prediction modes;
generating an intra predictor of the sub-block in the second block based on the determined intra prediction mode; and
encoding or decoding the sub-block in the second block for output based on the intra predictor of the sub-block in the second block.

18. The non-transitory computer readable medium according to claim 17, wherein determining the intra prediction mode comprises setting a most frequent intra prediction mode among the identified intra prediction modes as the intra prediction mode for processing the sub-block in the second block.

19. The non-transitory computer readable medium according to claim 17, wherein
the at least two reference unit cells include a predetermined number of reference unit cells that are clustered about a center of the reference region.

20. The non-transitory computer readable medium according to claim 17, wherein
the at least two reference unit cells include multiple groups of reference unit cells that are clustered about different corners of the reference region, respectively.

21. A method of video coding, comprising:
receiving input data associated with a first block and a second block of an image frame, the first block corresponding to a first color space component of the image frame, and the second block corresponding to a second color space component of the image frame;
identifying a reference region in the first block according to a sub-block in the second block, the reference region and the sub-block in the second block corresponding to a same region in the image frame, and the reference region being partitioned into one or more unit cells of a predetermined size in pixels;
identifying an intra prediction mode for processing, using intra prediction coding, a reference unit cell that is closest to a center of the reference region in a predetermined direction;
determining an intra prediction mode for processing, using the intra prediction coding, the sub-block in the second block based on the identified intra prediction mode;
generating an intra predictor of the sub-block in the second block based on the determined intra prediction mode; and
encoding or decoding the sub-block in the second block for output based on the intra predictor of the sub-block in the second block.

22. The method according to claim 21, wherein
the first color space component is a luma component, and the second color space component is a chroma component.

* * * * *